US009723936B2

(12) United States Patent
Nales (10) Patent No.: US 9,723,936 B2
(45) Date of Patent: Aug. 8, 2017

(54) PLATE STACKING DEVICE

(75) Inventor: Michel Nales, Twello (NL)

(73) Assignee: HORENA TRADING HOLLAND BV, Twello (NL)

(*) Notice: Subject to any disclaimer, the term of this patent is extended or adjusted under 35 U.S.C. 154(b) by 0 days.

(21) Appl. No.: 14/238,630

(22) PCT Filed: Aug. 15, 2012

(86) PCT No.: PCT/NL2012/050566
§ 371 (c)(1),
(2), (4) Date: Mar. 19, 2014

(87) PCT Pub. No.: WO2013/025100
PCT Pub. Date: Feb. 21, 2013

(65) Prior Publication Data
US 2014/0305888 A1    Oct. 16, 2014

(30) Foreign Application Priority Data
Aug. 15, 2011 (NL) .................................... 2007263
Feb. 24, 2012 (NL) .................................... 2008349

(51) Int. Cl.
*A47G 19/08* (2006.01)
*A47J 47/16* (2006.01)

(52) U.S. Cl.
CPC .............. *A47G 19/08* (2013.01); *A47J 47/16* (2013.01)

(58) Field of Classification Search
CPC .................................. A47J 47/16; A47G 19/08
USPC ...... 211/41.1, 41.2, 41.3, 41.7, 41.13, 41.14, 211/49.1, 50, 205, 71.01; 206/449, 499; 248/121, 122.1
See application file for complete search history.

(56) References Cited

U.S. PATENT DOCUMENTS

| D41,688 S | 2/1864 | Hohner |
|---|---|---|
| 601,753 A | 4/1898 | Kraiser |
| D43,080 S | 10/1912 | De Ajuria |
| 1,089,290 A | 3/1914 | Thompson |
| 1,167,934 A | 1/1916 | Roth |
| 1,348,792 A | 8/1920 | Feingold |
| 1,652,114 A | 12/1927 | Gestrine |
| 1,677,318 A | 7/1928 | Alexander |
| 2,456,535 A | 12/1948 | Rundell |
| 2,906,488 A | 9/1959 | Wolar |
| 3,204,779 A | 9/1965 | Warner |

(Continued)

FOREIGN PATENT DOCUMENTS

| DE | 8632017 | 5/1987 |
|---|---|---|
| EP | 0432813 | 6/1991 |

(Continued)

OTHER PUBLICATIONS

International Search Report and Written Opinion from corresponding PCT/NL2012/050566, mailed Nov. 6, 2012.

*Primary Examiner* — Joshua J Michener
*Assistant Examiner* — Devin Barnett
(74) *Attorney, Agent, or Firm* — Steven M. Koehler; Westman, Champlin & Koehler, P.A.

(57) ABSTRACT

Plate stacking device comprising a vertical column with one or more side faces provided with plate supports. Each plate support comprises two upper projections horizontally in line with each other, and a lower projection which is longer than the two upper projections and which lies at a distance below the two upper projections. The upper projections projecting from a side face are lateral extensions of adjacent column walls.

3 Claims, 14 Drawing Sheets

(56) References Cited

U.S. PATENT DOCUMENTS

| | | | |
|---|---|---|---|
| 3,855,943 | A | 12/1974 | Larson |
| 4,354,603 | A | 10/1982 | Dunn |
| 4,368,822 | A | 1/1983 | Kramer |
| 4,527,697 | A | 7/1985 | Mastrodicasa |
| 4,589,556 | A | 5/1986 | Peretz |
| 4,778,064 | A | 10/1988 | Gold |
| 4,911,308 | A | 3/1990 | Nylund |
| 4,936,472 | A | 6/1990 | Meier |
| 5,088,605 | A | 2/1992 | Nales |
| 5,116,007 | A | 5/1992 | Von Gunton |
| 5,836,458 | A | 11/1998 | Nales |
| 5,944,200 | A | 8/1999 | Nales |
| 6,591,995 | B1 | 7/2003 | Grove |
| D573,809 | S | 7/2008 | Levy et al. |
| 7,857,146 | B2 | 12/2010 | Disch |
| 2006/0157430 | A1 | 7/2006 | Disch |
| 2010/0181442 | A1 | 7/2010 | Nales |

FOREIGN PATENT DOCUMENTS

| | | |
|---|---|---|
| FR | 2241953 | 3/1975 |
| FR | 2937234 | 4/2010 |
| GB | 340490 | 12/1930 |

FIG 17

PLATE STACKING DEVICE

CROSS-REFERENCE TO RELATED APPLICATION

This application is a Section 371 National Stage Application of International Application PCT/NL2012/050566 filed Aug. 15, 2012 and published as WO2013/025100 A1 in English.

BACKGROUND

The discussion below is merely provided for general background information and is not intended to be used as an aid in determining the scope of the claimed subject matter.

Aspects of the present invention relate to a stacking device for stacking plates, such as dishes, cups, bowls, serving trays or similar receptacles.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background A plate stacking device comprising a vertical column with side faces, one or more of the side faces being provided with plate supports. Each plate support comprises two upper projections horizontally in line with each other, and a lower projection which is longer than the two upper projections and which lies at a distance below the two upper projections. The upper projections projecting from a side face are lateral extensions of adjacent column walls.

This way, the upper projections can be made as an integral part of the wall elements, which can for instance be made of sheet metal plates or profiles using very economic production methods. The number of steps during assembly of the device is substantially reduced. A more compact configuration can be achieved allowing to stack more dishes in a given space.

In a specific embodiment, the lateral extensions of a column wall can be provided with a hook element, such as a vertical slit or incision at their respective lower edges, engaging a complementary hooking section, such as a non-vertical edge, of an adjacent column wall. This way, the wall elements can be easily coupled by hooking and are kept together under their own weight.

The lateral extensions of each side face can be alternately arranged between lateral extensions of an adjacent side face. At the edges of the column the height of the lateral extensions can for instance correspond to the distance between two parallel lateral extensions arranged above each other. The elements forming the side faces can for instance be coupled by providing the lateral extensions with a slit for receiving a top section of a lower lateral extension of an adjacent side face. This way, the plate stack device can be assembled in a very simple, fast and low-cost way.

The lateral extensions can have any shape suitable for holding a plate. The extensions can for instance be triangular. To provide a good grip between the plate and the plate support, the lateral extensions can comprise an outer tip forming the lowest point of the extension. This can for instance be obtained by providing the lateral extensions with a lower edge extending downwardly away from the column making an angle of less than about 5°, e.g., less than 2°, with the horizontal.

The plate stacking device can be used for a large range of plate sizes if the lower projection is adjustable in height relative to the lateral extensions. This can for example be achieved with a frame of beam carrying the lower projections of one side, wherein the beam or frame is slideable within the column, wherein the lower projections project through vertical slots centrally arranged in the side faces of the column.

To protect the stacked plates the lateral extensions and/or the lower projections can be capped with a protective material. To allow use within an oven or steamer the protective material can for example be a heat resistant silicone plastic.

The plate supports are typically equally sized and arranged at equal distance above each other. However, if so desired the distances between the plate supports can be different and/or the size and shapes of the various plate supports can be different, for instance if plates or trays of different size or shape need to be stacked.

The lower projection of the plate supports can for instance be a pin, a double pin, a bar, a beam or sheet metal strip or have any shape suitable for supporting the lower side of a plate, dish, tray or similar device.

The plate stacking device can stand on a base or it can be designed as a wheeled trolley if so desired.

The plate stacking device will typically have a column with a square or rectangular cross section, presenting four sides for stacking plates.

An aspect of the invention also relates to a wall element forming a side face of a plate stacking device as disclosed above. Such a wall element can for instance be a sheet metal plate, e.g., sheets of a corrosion resistant steel. The sheet metal plate can be flat. It can be manufactured by cutting the contour, e.g., by punching or by laser cutting. To assemble a plate stack device, four wall elements can be coupled at their longitudinal edges by positioning the lateral extensions of one element crosswise between the extensions of the two adjacent elements. The distance between the lateral extensions can be the same as the height of the extensions at the edges. This way, the lateral extensions of one wall element fit between two extensions of an adjacent wall element to form a device with substantially identically spaced and sized plate supports on adjacent sides. At the edge of the column the lateral extensions can be provided with a slit for receiving the upper section of the lateral extension below it.

The object of the invention is also achieved with a plate stacking device comprising a column having two oppositely directed U-shaped profiles which fit into each other, one of the profiles having side legs with extensions forming the upper projections of the respective plate supports. In this respect, oppositely directed means that the legs of the two U-shaped profile point in opposite directions.

The lower projections of plate supports of the device can for example be carried by a rod or similar longitudinal member held between the two U-shaped profiles. Each lower projection projects through a corresponding slit in one of the faces of one of the U-shaped profiles.

In a specific embodiment, the column comprises:
an inner U-shaped profile with a front face and two side legs, and a second U-shaped profile with a back face and two side legs, wherein the second U-shaped profile fits between the two side legs of the first U-shaped profile, while the first and second U-shaped profiles are oppositely directed;

wherein the front face of the first U-shaped profile is provided with slits aligned in two parallel lines adjacent the side legs and a third line centrally between the two other lines of slits, wherein each slit in a line adjacent one side leg is paired with a corresponding slit at the same height in the line adjacent the other side leg, and with a lower slit of the central line of slits;

wherein the upper projections of the plate supports are formed by regularly spaced extensions of the side legs of the second U-shaped profile, said extensions fitting into the aligned slits in the front face of the first U-shaped profile of the lines adjacent the side legs;

wherein the lower projections of the column are carried by a rod or similar longitudinal member held between the back plate of the second U-shaped profile and the front plate of the first U-shaped profile, wherein each lower projection projects through a corresponding slit of the central line of slits in the front face of the first U-shaped profile.

In a specific embodiment, the rod or similar member carrying the lower projections can be adjustable in height. This way, the height of the lower projections relative to the height of the upper extensions, can be adjusted depending of the dimensions of the plates to be carried.

The centrally arranged lower projections are typically longer than the two lateral upper projections. The outer ends of the lower projections can be capped with a cap of a heat resistant plastic or similar material.

In a specific embodiment, the U-shaped profiles can be provided with hook means enabling them to fixate themselves under their own weight. For instance, the extensions of the inner profile can be provided with a lower edge with a vertical incision at a point where the lower edge of the extension rests in the corresponding slit in the outer profile. When the plate stacking device is assembled, the vertical incision hooks over the lower point of the corresponding slit in the outer profile and the inner profile fixates itself relative to the outer profile under its own weight.

The extensions forming the upper projections can for instance be triangular, e.g., with a lower edge substantially perpendicular to the back plate of the respective U-shaped profile. The extensions can for instance be covered with a cap or sleeve or the like of a heat resistant plastic or similar material.

The device can for instance be part of a trolley or similar carrier or table carrying one or more of such stacking devices.

BRIEF DESCRIPTION OF THE DRAWINGS

Aspects of the invention will be further explained under reference to the accompanying drawings.

DETAILED DESCRIPTION

Figure 1:
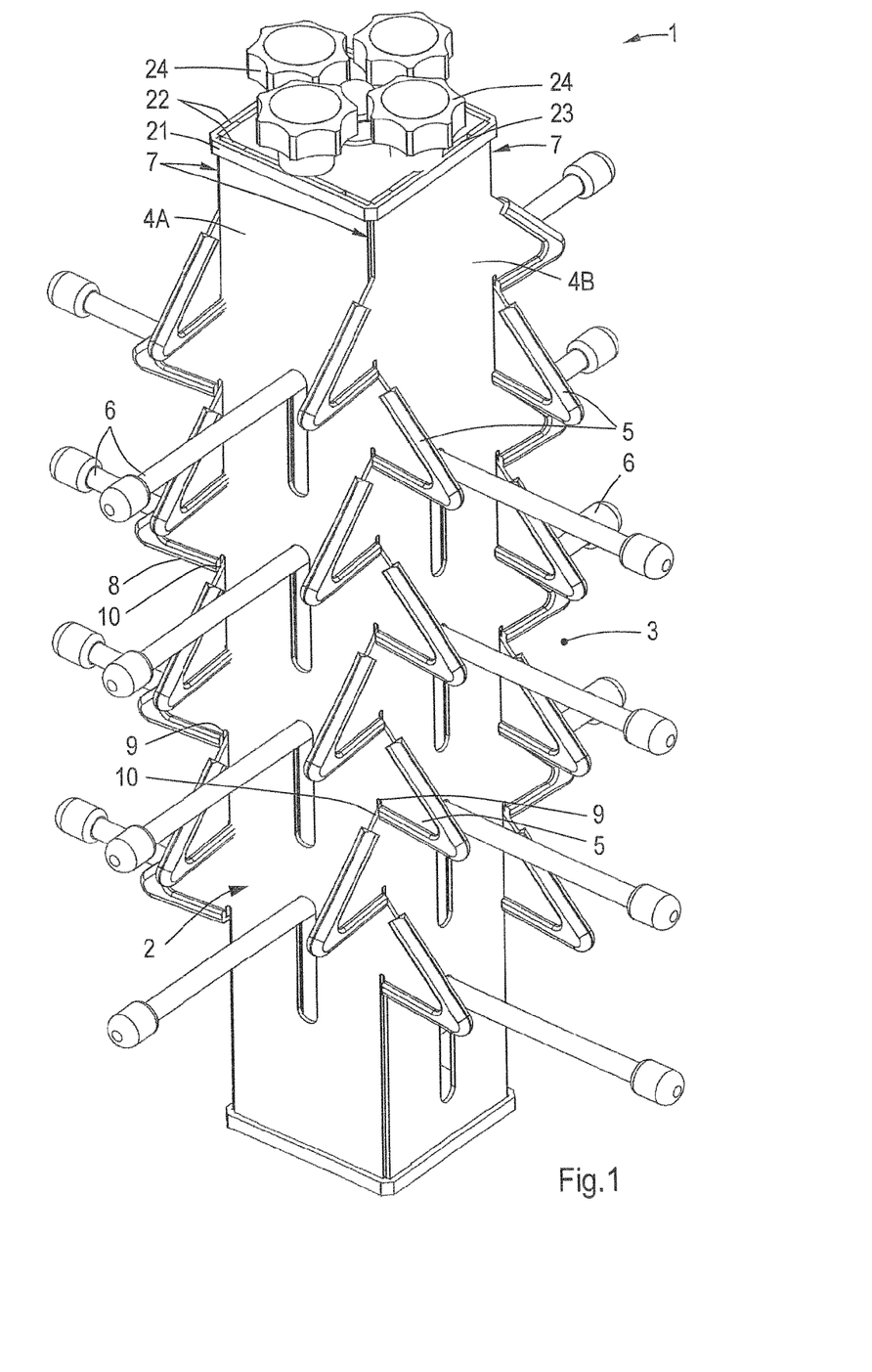
FIG. 1: shows an exemplary embodiment of a plate stacking device.

FIG. 1 shows a plate stacking device 1 according to an aspect of the present invention. The same device is shown in exploded view in FIG. 6. The plate stacking device 1 comprises a vertical column 2 with a plurality of plate supports 3 at four side faces 4A, 4B being illustrated in FIG. 1. Each plate support 3 comprises two symmetrically arranged projections 5 horizontally substantially in line with each other, and a longer third projection 6 which lies substantially centrally below the other two projections 5.

The two symmetrically arranged projections 5 of each plate support 3 are triangular lateral extensions of adjacent side faces 4A, 4B. These extensions 5 extend beyond the vertical edges 7 of the column 2. The lateral extensions 5 of one side face 4A are orthogonally and alternately arranged between the lateral extensions 5 of an adjacent side face 4B. At the edge 7 of the column 2 the lower edge 8 of the lateral extension 5 is provided with a slit 9. The slit 9 receives a top section 10 of a lower lateral extension 5 of the adjacent side face.

Figure 3:
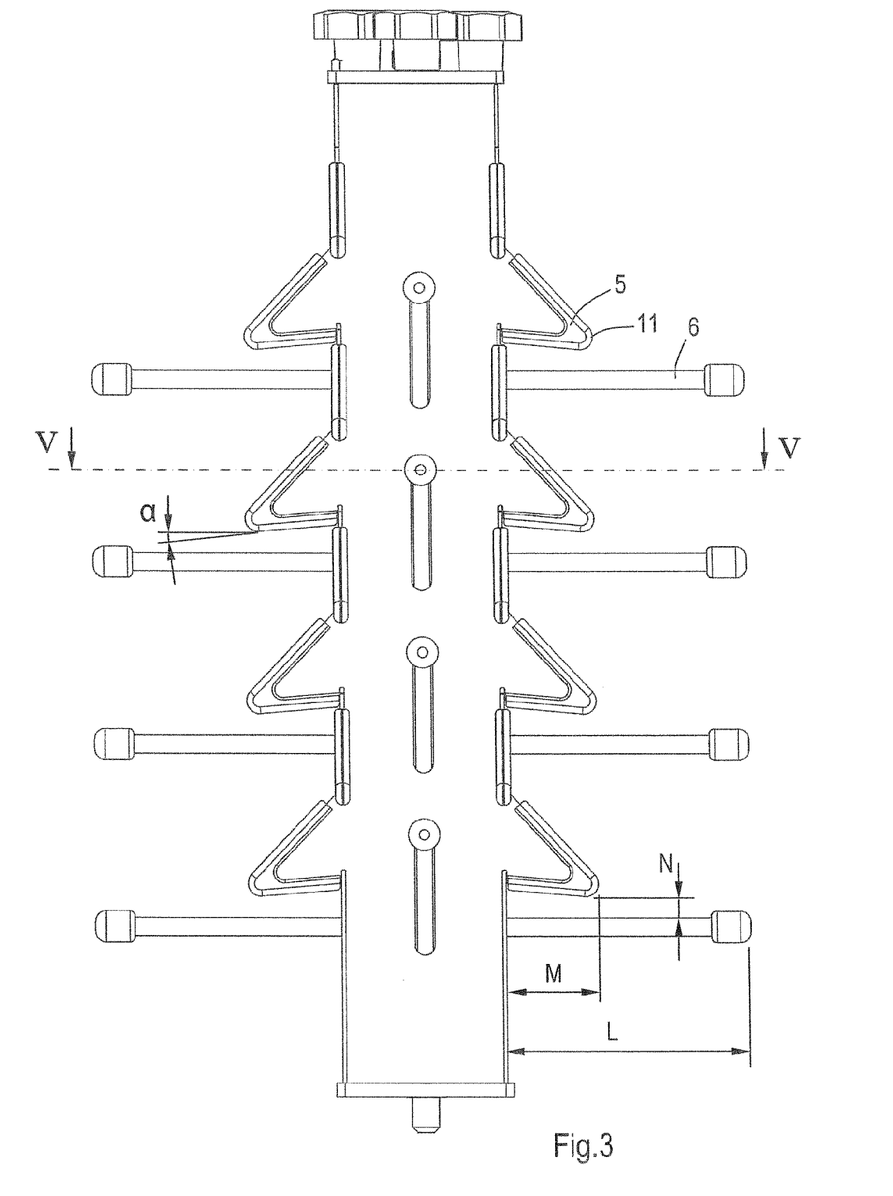
FIG. 3: shows a side view of the device of FIG. 1.

As shown in FIG. 3, the lower edges 8 of the lateral side face extensions 5 extend downwardly away from the column 2 and make an angle α of about 1-2° with the horizontal. The outer tip 11 of the extension 5 forms the lowest point of the extension 5.

The edges of the lateral extensions 5 are protected with a cover 12 of a protective heat resistant material. Similarly, the outer end of the lower projections 6 are protected with a heat resistant cap 13.

Figure 2:
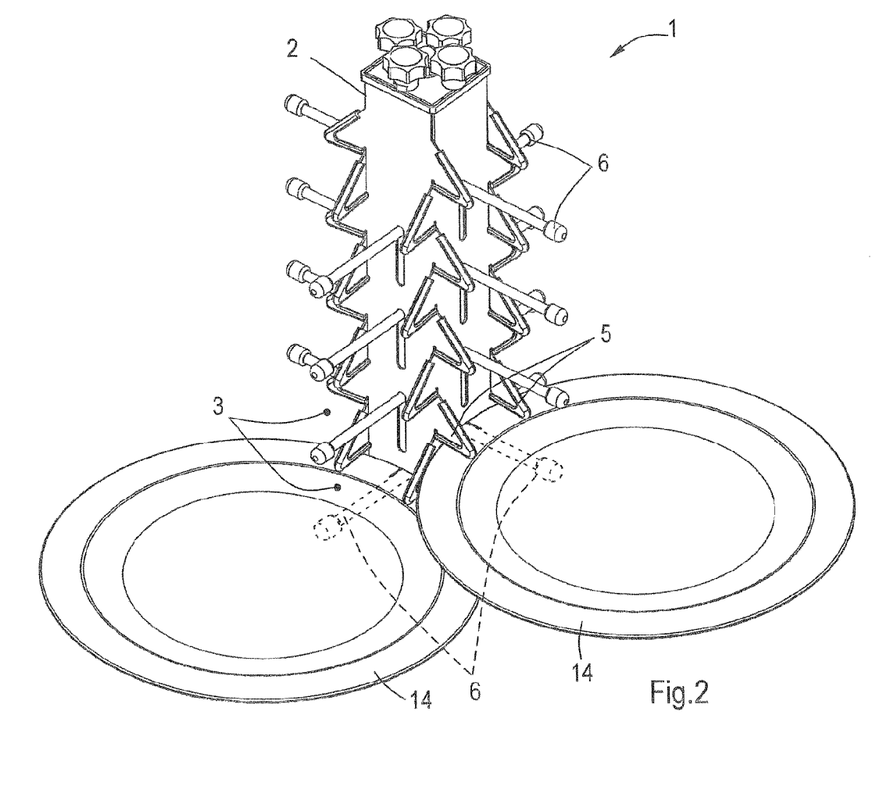
FIG. 2: shows the device of FIG. 1 with two stacked plates.

As shown in FIG. 2, a plate or dish 14 can be stacked by placing it in a plate support 3 where it rests on the lower projection 6 (shown in interrupted line in FIG. 2) of the plate support 3 while the plate is balanced by the two lateral extensions 5. The plates 14 can carry food products which are ready for serving or which may need to be treated in an oven, steamer, cooling or other station for food preparation.

In the shown embodiment, the length L of the lower projection 6 (see FIG. 3) is about 3 times the distance M of the outer tip 11 to the column 2. Depending on the type, shape and size of the dishes to be stacked, the lower projection can be longer or smaller. The vertical distance N between the lower projection and the outer tip 11 of the lateral side face extensions 5 is adjustable.

Figure 4:
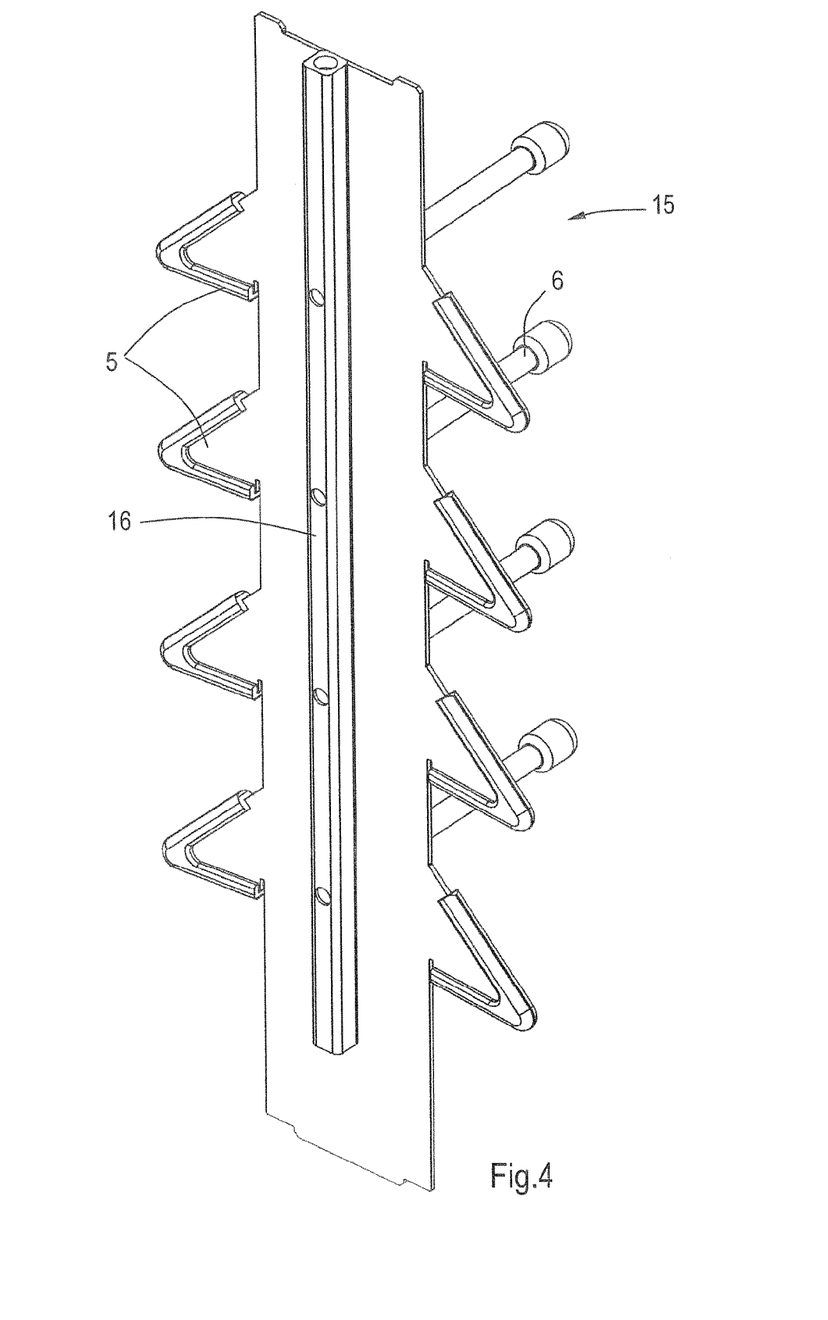
FIG. 4: shows a wall element of the device of FIG. 1.

The side faces 4A, 4B with the lateral extensions 5 are formed by wall elements 15 made of a flat strip of sheet metal manufactured by laser cutting. Such a wall element 15 is shown in FIG. 4 together with a vertically arranged hollow beam 16 carrying the lower projections 6 which project through vertical slots 17 (see FIG. 1) extending along the longitudinal center line of the wall element 15. The distance between the projections 6 is substantially the same as the distance between the center points of the slots 17. This way the projections 6 can all be moved simultaneously up and down within the respective slots 17 by moving the hollow beam 16 up and down relative to the wall element 15. Instead of a hollow beam, a solid beam can be used.

Figure 5:
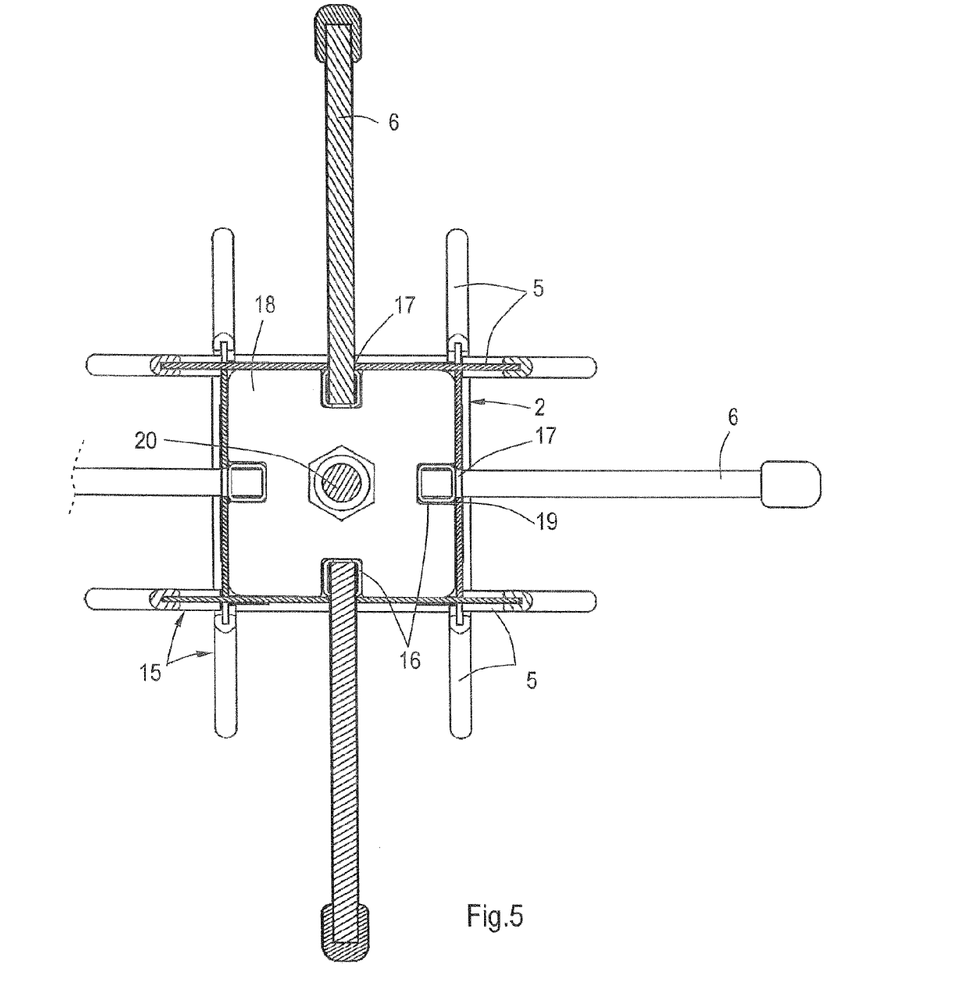
FIG. 5: shows a cross section of the device of FIG. 1 along the line V-V in FIG. 3.

FIG. 5 shows a cross section of the plate stack device 1 along the line V-V in FIG. 3. Four wall elements 15 are assembled to form the column 2 which is square in cross section. Lateral extensions 5 extend beyond the edges 7 of the column 2. The hollow beams 16 are positioned centrally at the inner side of each wall element 15, carrying projections 6 which project through the slots 17 in the corresponding wall element 15. The four hollow beams 16 are kept in place by a spacer 18. In this particular embodiment the spacer 18 is a sheet metal square part with square or rectangular recesses 19 for receiving the hollow beams 16. If so desired, the spacers 18 can also have any other suitable alternative outline effectively spacing the beams 16.

Figure 6:
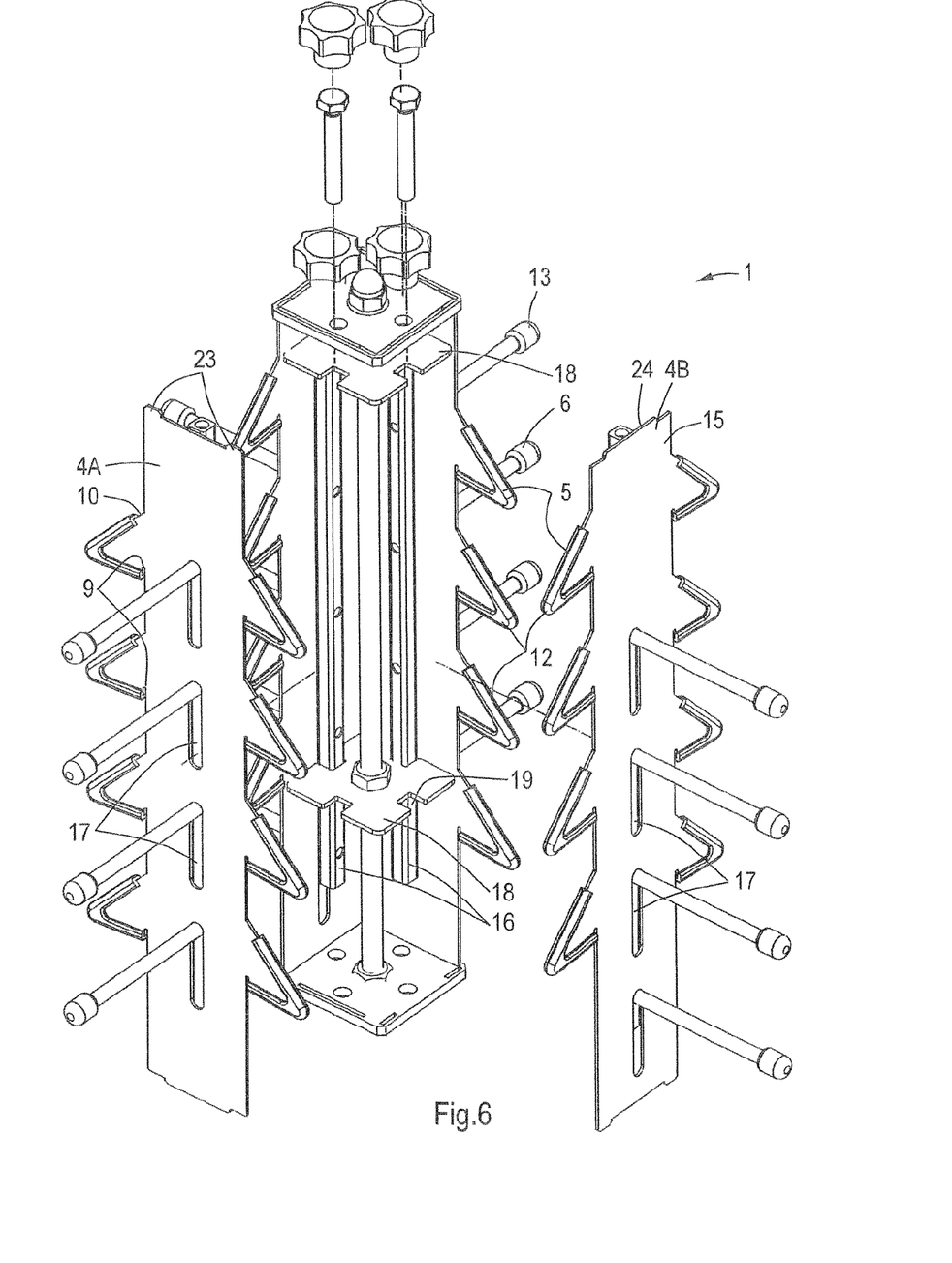
FIG. 6: shows the device of FIG. 1 in exploded view.

Within the column 2 a plurality of spacers 18 is held at regular distance above one another by a threaded rod 25, as shown in FIG. 6. The rod 25 runs through threaded central openings 20 in each of the spacers 18.

As shown in FIG. 1 the column 2 is capped by a lid 21 provided with slits 22 near the edges for receiving matching ledges 23 at the top side of the wall elements 15. The lid 21 supports four rotary knobs 24 connected to the respective top ends of the four hollow beams 16. These knobs 24 cooperate with the hollow beams 16 as set screws for adjustment of the height of the hollow beams 16. By rotating one of these knobs 24 the corresponding hollow beam 16 is lifted or lowered together with the projections 6 carried by the respective hollow beam 16. This way, the height of the projections 6 at one side of the column can be adjusted by rotating the respective knob 24. The height of the projections 6 at one side of the column can be adjusted independently from the height of the projections 6 at the other sides. This way, the four sides of the column can be configured for use with plates of different sizes or shapes.

Figure 7:
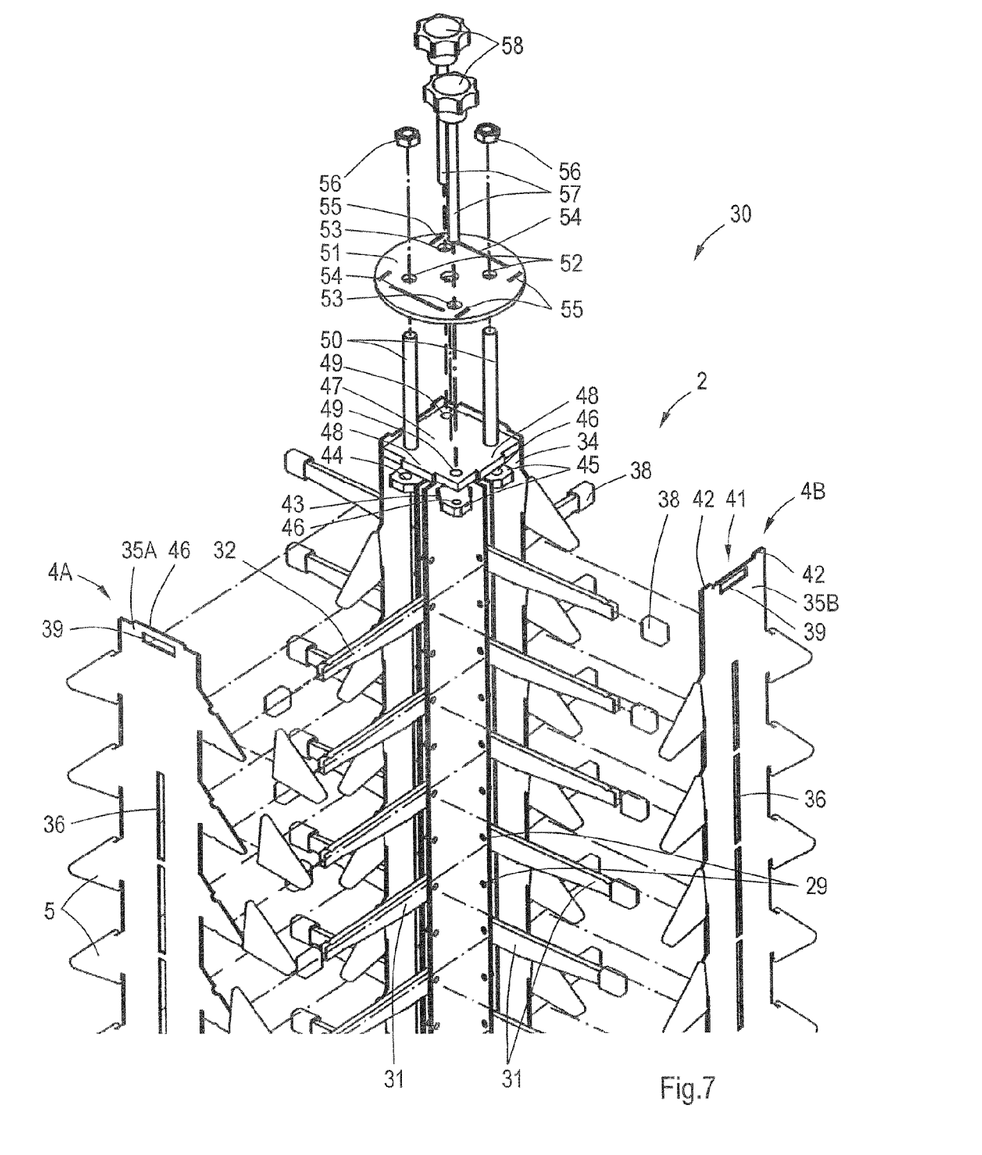
FIG. 7: shows the top section of a second embodiment of a plate stack device.
Figures 8, 9:
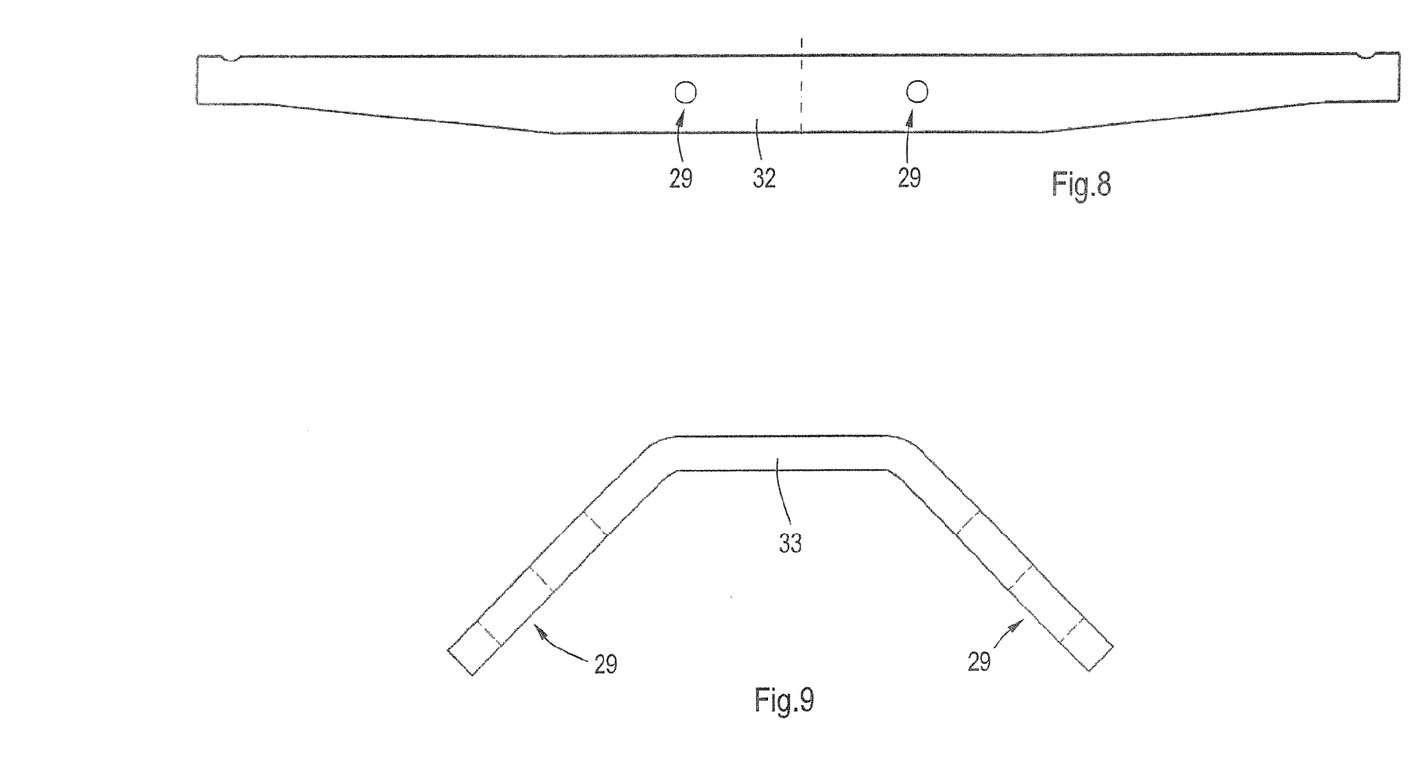
FIG. 8: shows a strip for forming a projection of a plate support of the stack device in FIG. 7.
FIG. 9: shows a profile for an inner column of the device in FIG. 7.
Figure 10:
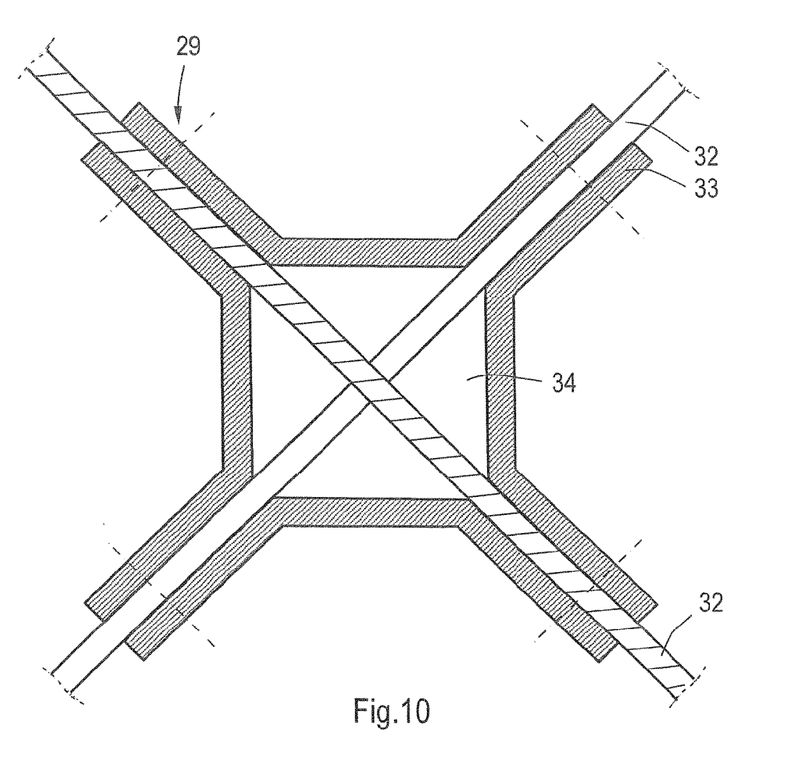
FIG. 10: shows in cross section an inner column of the device of FIG. 7.

FIG. 7 shows the top end of a second possible embodiment of a plate stacking device 30 in exploded view. Parts similar to parts in the first embodiment are indicated with the same referential numbers. The plate stacking device 30 comprises a vertical column 2 with side faces 4A, 4B provided with upper projections 5 and longer lower projections 31. Lower projections 31 at the same height at opposite sides of the column 2 are made of one single strip 32, shown separately in FIG. 8. These strips 32 are held between four angled profiles 33 which are bent twice in cross section symmetrically over 135 degrees, as shown in FIG. 9. The strips 32 and the profiles 33 are provided with openings 29 for receiving fastening elements for joining the strips 32 and the profiles 33, as shown in cross section in FIG. 10. This way, the four joint profiles 33 form an inner column 34 with the strips 32 extending from all four sides.

The side panels 35A, 35B are provided with vertical slits 36 for receiving the strips 32. After positioning the panels 35A, 35B, the ends of the strips 32 are provided with protective caps 38. The top ends of the panels 35A, 35B are provided with a horizontal slit 39. The top ends of two opposite panels 35A are provided with a ledge 40, while the other two panels 35B have top ends provided with recesses 41 flanked by two projections 42.

The top ends of the profiles 33 are provided with horizontal slits 43. A horizontally positioned cross 44 has four arms 45 extending through these slits 43. The ends of the arms 45 of the cross 44 are provided with screw threaded openings 46.

The top of the column 2 is capped by a square top cover plate 47 with side ledges 48 at each side. These side ledges 48 are received in the horizontal slits 39 at the top ends of the side panels 35A, 35B. Two opposite corners of the square top cover plate 47 are provided with openings 49, while the two other corners are provided with screw threaded pins 50.

A circular top plate 51 is placed on top of the square top cover plate 47. The circular plate 51 comprises four openings 52, 53. Two opposite openings 52 receive the pins 50, while the two other openings 53 are in line with the openings 49 of the square top cover plate 47 and openings in two opposite arms 45 of the cross 44. The circular plate 51 further comprises two opposite longer slits 54 for receiving the ledges 40 at the top ends of side panels 35A. The longer slits 54 in the circular plate 51 are flanked by two shorter slits 55 under right angels with the longer slits 54. These shorter slits 55 receive the projections 42 at the top ends of side panels 35B. Nuts 56 cooperate with the screw threaded pins 50 to fasten the circular plate 51 to the square top cover plate 47. The top ends of the screw threaded pins 50 can for instance be used to attach the column 2 to a frame (not shown).

Two adjustment screws 57 provided with knobs 58 at their respective top ends are inserted into the two opposite openings 53 in the circular plate, the openings 49 of the square top cover plate 47 and the screw threaded openings 46 in two opposite arms 45 of the cross 44. By rotating the knobs 58, the distance between the cross 44 and the square top cover plate 47 can be adjusted. The inner column 34 with the projections 31 moves vertically with the cross 44, while the side panels 35A, 35B stay in place. The length of the slits 36 receiving the projections 31 is such that the height of the projections 31 can be adjusted over a desired distance. This way, the height of the projections 31 can be adjusted at all sides simultaneously.

Figure 11:
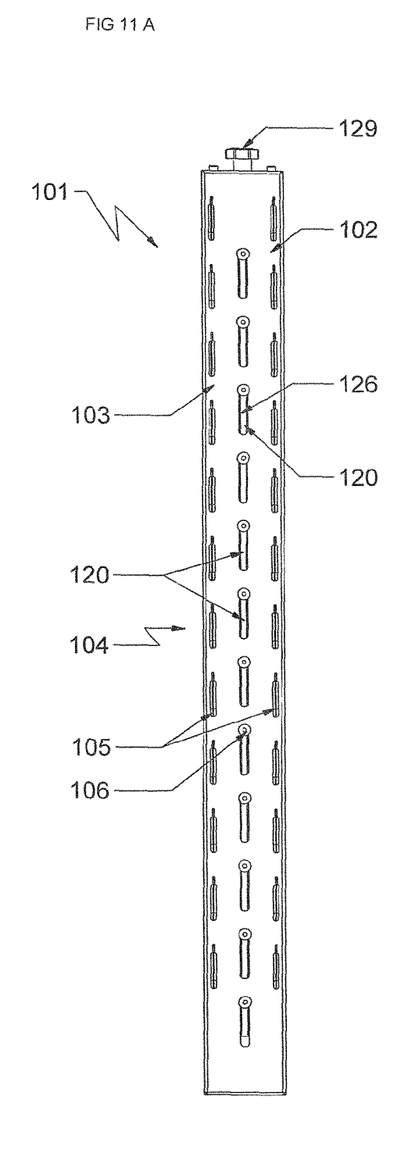
FIG. 11A-B: show a device in front view and side view, respectively.

FIGS. 11A and 11B show a plate stacking device 101 comprising a vertical column 102 with a front face 103 provided with a plurality of plate supports 104. Each plate support 104 comprises two upper projections 105 which are horizontally in line with each other, and a lower projection 106 which is longer than the two upper projections 105. The lower projection 106 lies centrally between the two upper projections 105 at a distance below them.

Figure 12:
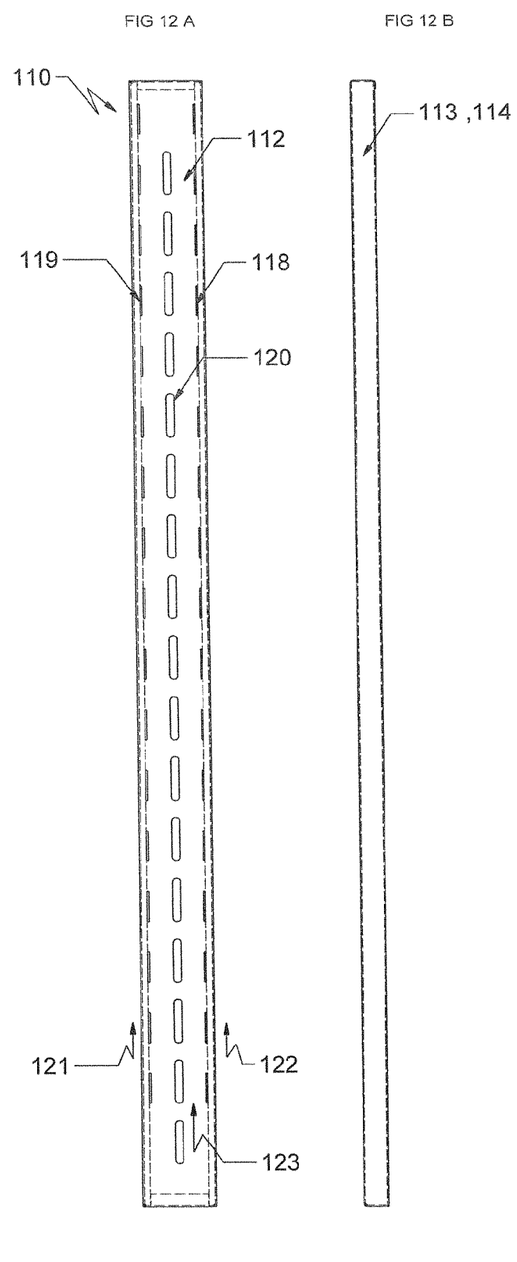
FIG. 12A-B: shows a U-shaped outer profile for the device of FIGS. 11A-B in side view and top view respectively.
Figure 13:
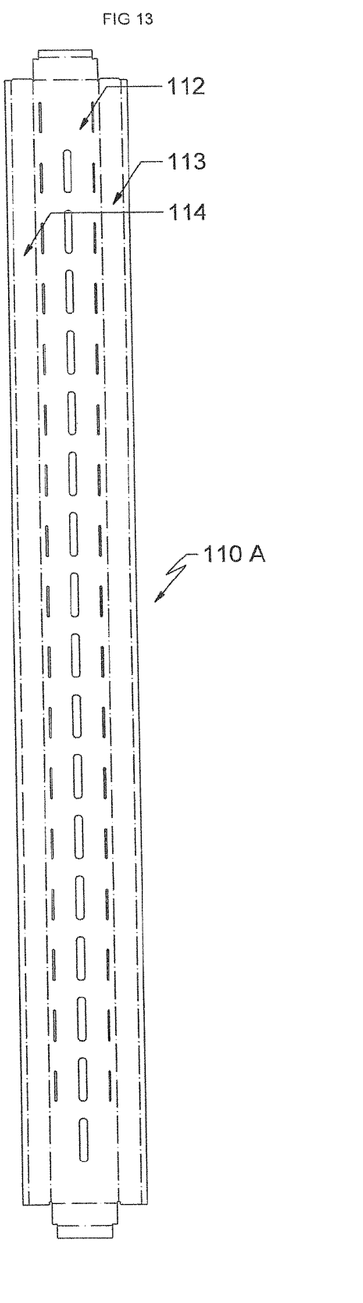
FIG. 13: shows a blank for the profile of FIGS. 12A-B.
Figure 14:
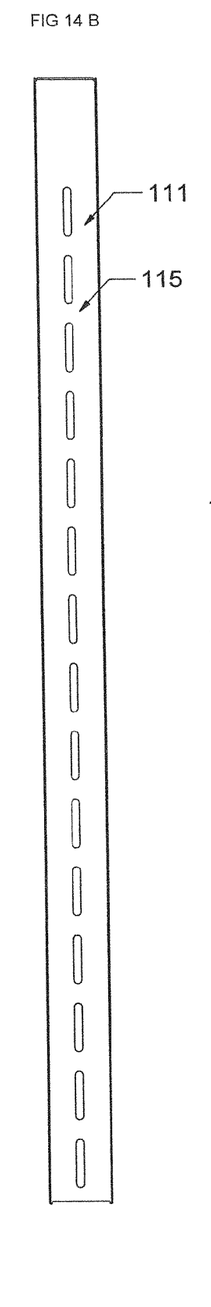
FIG. 14A-B: shows a U-shaped inner profile for the device of FIGS. 11A-B in side view and top view respectively.
Figure 15:
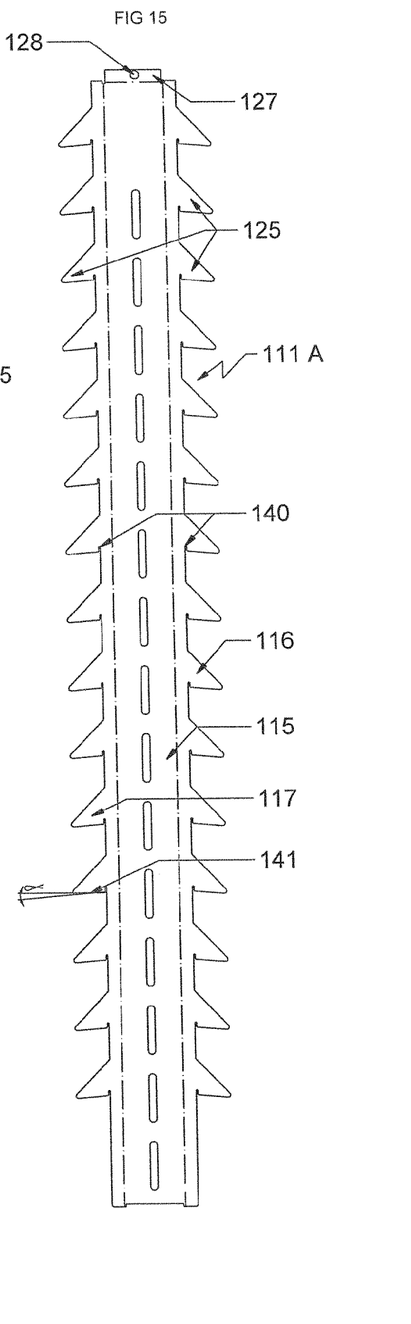
FIG. 15: shows a blank for the profile of FIGS. 14A-B.

The vertical column 102 is formed by an outer U-shaped profile 110, shown in FIGS. 12A and 12B, and an inner U-shaped profile 111, shown in FIGS. 14A and 14B. A blank 110A for producing the outer profile 110 is shown in FIG. 13. A blank 111A for producing the inner profile 111 is shown in FIG. 15. The outer U-shaped profile 110 is provided with a front face 112 and two side legs 113, 114. Similarly, the inner U-shaped profile 111 is provided with a back face 115 and two side legs 116, 117. The inner U-shaped profile 111 fits between the two side legs 113, 114 of the outer U-shaped profile 10. The two U-shaped profiles 110, 111 are oppositely directed, with the legs 116, 117 of the inner profile 111 pointing into a direction opposite to the pointing direction of the legs 113, 114 of the outer profile 110.

The front face 112 of the outer U-shaped profile 110 is provided with vertical slits 118, 119, 120 aligned in two parallel vertical lines or rows 121, 122 adjacent the side legs 113, 114 and a third vertical line 123 centrally between the two other lines 121, 122 of slits. Each slit 118 in a line 121 adjacent one side leg 113 is paired with a corresponding slit 119 at the same height in the line 122 adjacent the other side leg 114, and with a lower slit 120 of the central line 123 of slits 120.

The upper projections 105 of the plate supports 104 are formed by regularly spaced triangular extensions 125 of the side legs 116, 117 of the inner U-shaped profile 111. The triangular extensions 125 are fitted into the aligned slits 118, 119 in the front face 112 of the outer U-shaped profile 110 of the lines 121, 122 adjacent the side legs 113, 114. The triangular extensions 125 have a lower edge 141 making an angle α of about 0-5 degrees with a line extending perpendicular to the back plate 115 of the inner profile 111. As a result, the extensions 125 point slightly downwardly.

The lower projections 106 are carried by a vertically extending rod 127 or similar longitudinal member held between the back plate 115 of the inner U-shaped profile 111 and the front plate 112 of the outer U-shaped profile 110. Each lower projection 106 projects through a corresponding vertically extending slit 120 of the central line 123 of slits in the front face 112 of the outer U-shaped profile 110. The distance between the lower projections 106 corresponds to the distance between the lower points of the slits 120. This way, the height of all lower projections 106 can be adjusted simultaneously by moving the rod 126 up or down. To this end, the top end of the rod 126 projects from the top side of the column 102 formed by a top flange 127 of the inner profile 111. To allow passage of the rod 126, the top flange 127 of the inner profile 111 is provided with an opening 128 (see FIG. 15). The top end of the rod 126 is provided with a set screw 129 or similar device, arranged on top of the column 102.

The centrally arranged lower projections 106 are longer than the two lateral upper projections 105. The outer ends of the lower projections 106 are capped with a cap 130 of a heat resistant plastic or similar material. Similarly, the extensions 125 forming the upper projections of the plate supports 104 are covered with a cap or sleeve of a heat resistant plastic.

The inner profile 111 is provided with vertical slits or incisions 140 at a point where the lower edge 141 of the extensions 125 hangs within the corresponding slit 118, 119 in the outer profile 110. This way, the inner profile 111 fixates itself relative to the outer profile 110 under its own weight.

Figure 16:
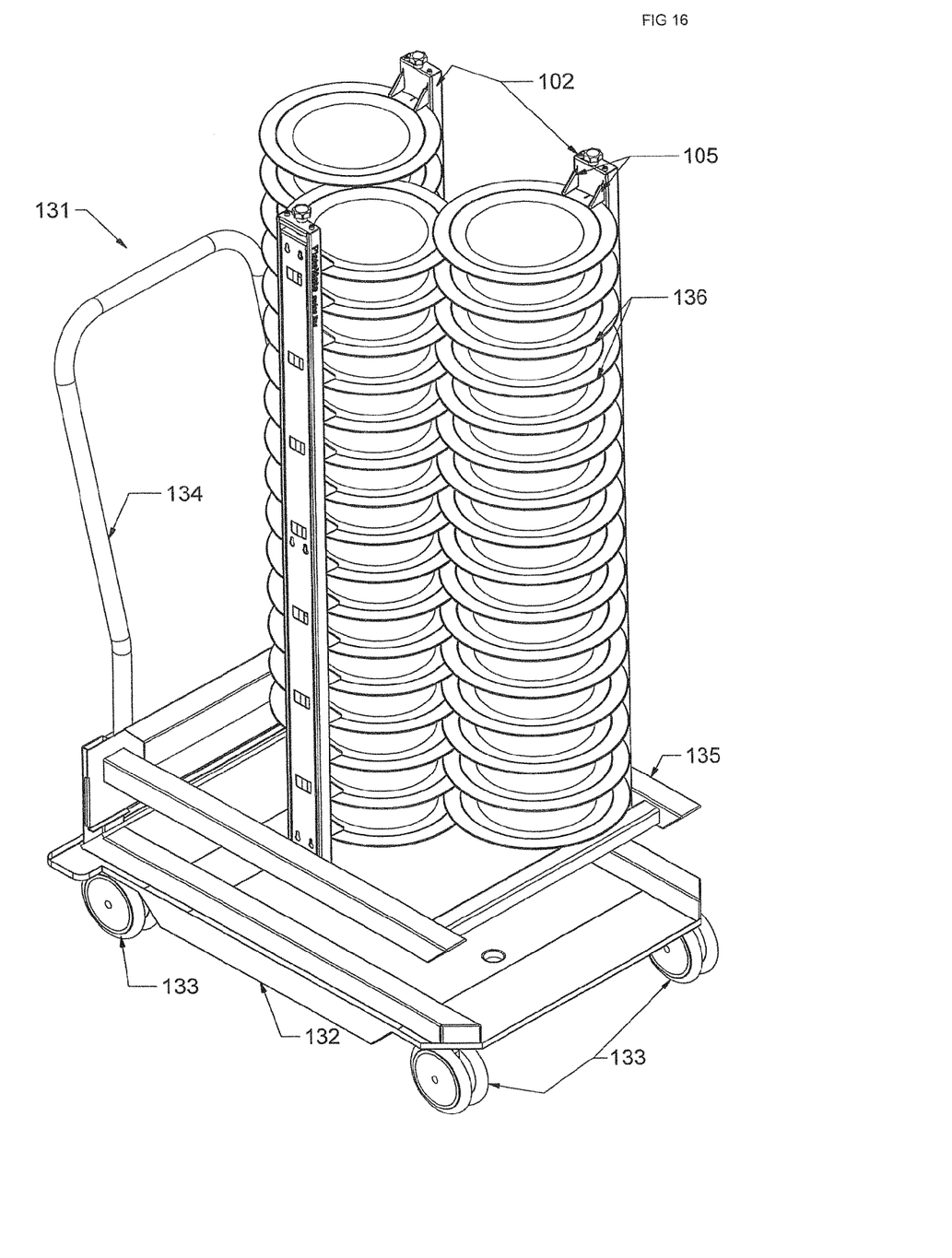
FIG. 16: shows a trolley with a plurality of devices of FIG. 11A-B.
Figure 17:
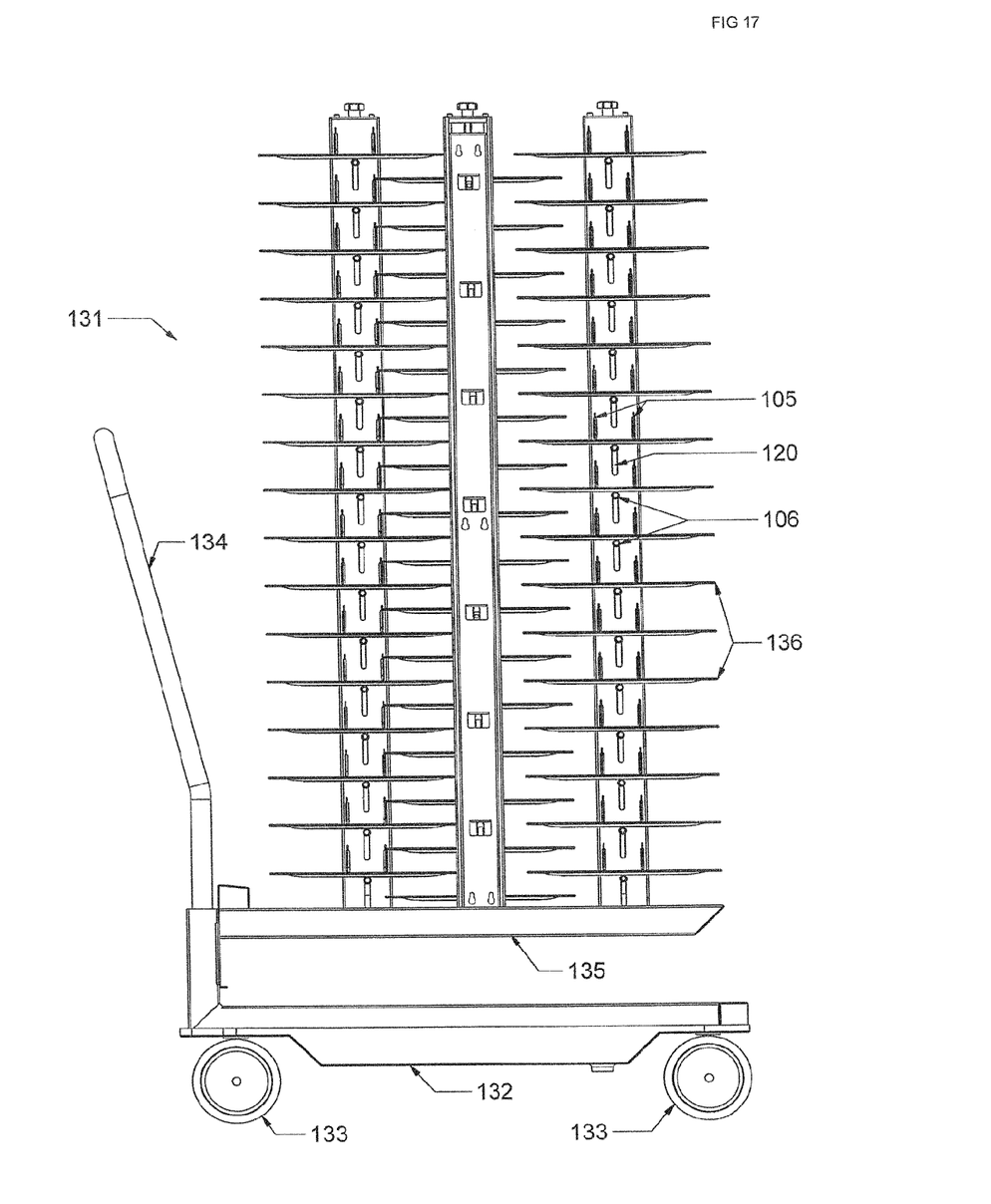
FIG. 17: shows the trolley of FIG. 16 in side view.

FIGS. 16 and 17 show a trolley 131, with a bottom 132 supported by four wheels 133. One side of the trolley 131 comprises a pushing frame 134 enabling a user to push the trolley 131 forward. The trolley 131 carries a substantially horizontal support frame 135 carrying a plurality of columns 102 as described with reference to FIGS. 11-15 holding plates 136.

The invention claimed is:

1. A plate stacking device comprising a vertical column with side faces, one or more of the side faces being provided with plate supports, wherein each plate support comprises two upper projections horizontally in line with each other, and a lower projection which is longer than the two upper projections and which lies at a distance below the two upper projections, wherein the upper projections projecting from a first side face are lateral extensions of further side faces adjacent to said first side face, and wherein the column comprises two oppositely directed U-shaped profiles which are fitted into each other, one of the profiles having side legs with the lateral extensions forming the upper projections of the respective plate supports.

2. The plate stacking device according to claim 1 wherein the lower projections of plate supports of the device are carried by a longitudinal member held between the two U-shaped profiles, wherein each lower projection projects through a corresponding slit in one of the faces of one of the U-shaped profiles.

3. The plate stacking device according to claim 1, wherein the column comprises:

an outer U-shaped profile with a front face and two side legs, and an inner U-shaped profile with a back face and two side legs, wherein the inner U-shaped profile fits between the two side legs of the outer U-shaped profile, while the inner and outer U-shaped profiles are oppositely directed;

wherein the front face of the outer U-shaped profile is provided with slits aligned in two parallel lines adjacent the side legs and a third line centrally between the two other lines of slits, wherein each slit in a line adjacent one side leg is paired with a corresponding slit at the same height in the line adjacent the other side leg, and with a lower slit of the central line of slits;

wherein the upper projections of the plate supports are formed by regularly spaced extensions of the side legs of the inner U-shaped profile, said extensions fitting into the aligned slits in the front face of the outer U-shaped profile of the lines adjacent the side legs; and wherein the lower projections of the column are carried by a rod or similar longitudinal member held between the back plate of the inner U-shaped profile and the front plate of the outer U-shaped profile, wherein each lower projection projects through a corresponding slit of the central line of slits in the front face of the outer U-shaped profile.

* * * * *